(12) United States Patent
Fukui

(10) Patent No.: US 7,474,344 B2
(45) Date of Patent: Jan. 6, 2009

(54) DRIVING CONTROL METHOD FOR IMAGE PICKUP DEVICE, IMAGE PICKUP APPARATUS, AND IMAGE PICKUP SYSTEM

(75) Inventor: Hiroshi Fukui, Kanagawa (JP)

(73) Assignee: Sony Corporation, Tokyo (JP)

( * ) Notice: Subject to any disclaimer, the term of this patent is extended or adjusted under 35 U.S.C. 154(b) by 1365 days.

(21) Appl. No.: 10/431,878

(22) Filed: May 7, 2003

(65) Prior Publication Data
US 2003/0234883 A1 Dec. 25, 2003

(30) Foreign Application Priority Data
May 9, 2002 (JP) .............................. 2002-133529

(51) Int. Cl.
*H04N 3/14* (2006.01)
*H04N 5/235* (2006.01)
(52) U.S. Cl. ...................................... 348/296
(58) Field of Classification Search ................. 348/230, 348/212, 222.1, 296, 297, 362
See application file for complete search history.

(56) References Cited
U.S. PATENT DOCUMENTS
5,695,359 A * 12/1997 Fujikura et al. ............. 439/495

FOREIGN PATENT DOCUMENTS
| JP | 6 14270 | 1/1994 |
| JP | 7 115590 | 5/1995 |
| JP | 7 131716 | 5/1995 |
| JP | 8 98093 | 4/1996 |
| JP | 9 154068 | 6/1997 |
| JP | 2000 4402 | 1/2000 |
| JP | 2000 134541 | 5/2000 |

\* cited by examiner

*Primary Examiner*—Lin Ye
*Assistant Examiner*—Trung Diep
(74) *Attorney, Agent, or Firm*—Frommer Lawrence & Haug LLP; Willaim S. Frommer

(57) ABSTRACT

The present invention enables prevention of influence of a trigger pulse in an image from an image pickup apparatus, with a simple structure and irrespective of exposure time and the cycle of the trigger pulse. The present invention provides an image pickup apparatus having a CCD image sensor 202 in which electric charges obtained by photoelectric conversion of incident light from an object are stored, the stored electric charges are swept away when a shutter pulse SUB is supplied, and after a read-out pulse SG is supplied, an image pickup signal based on the stored electric charges is read out synchronously with a horizontal synchronizing signal HD, and the image pickup apparatus comprises a timing generator 212 for generating the read-out pulse during a blanking period of the horizontal synchronizing signal, first shutter pulse generation means 310 for generating a first shutter pulse sub1 during every horizontal blanking period of the horizontal synchronizing signal except for a period from generation of a trigger pulse TRIG until generation of the read-out pulse, second shutter pulse generation means 320 for generating a second shutter pulse sub2 at the timing of the trigger pulse, and a switch 330 for selecting either the first shutter pulse sub1 or the second shutter pulse sub2.

4 Claims, 8 Drawing Sheets

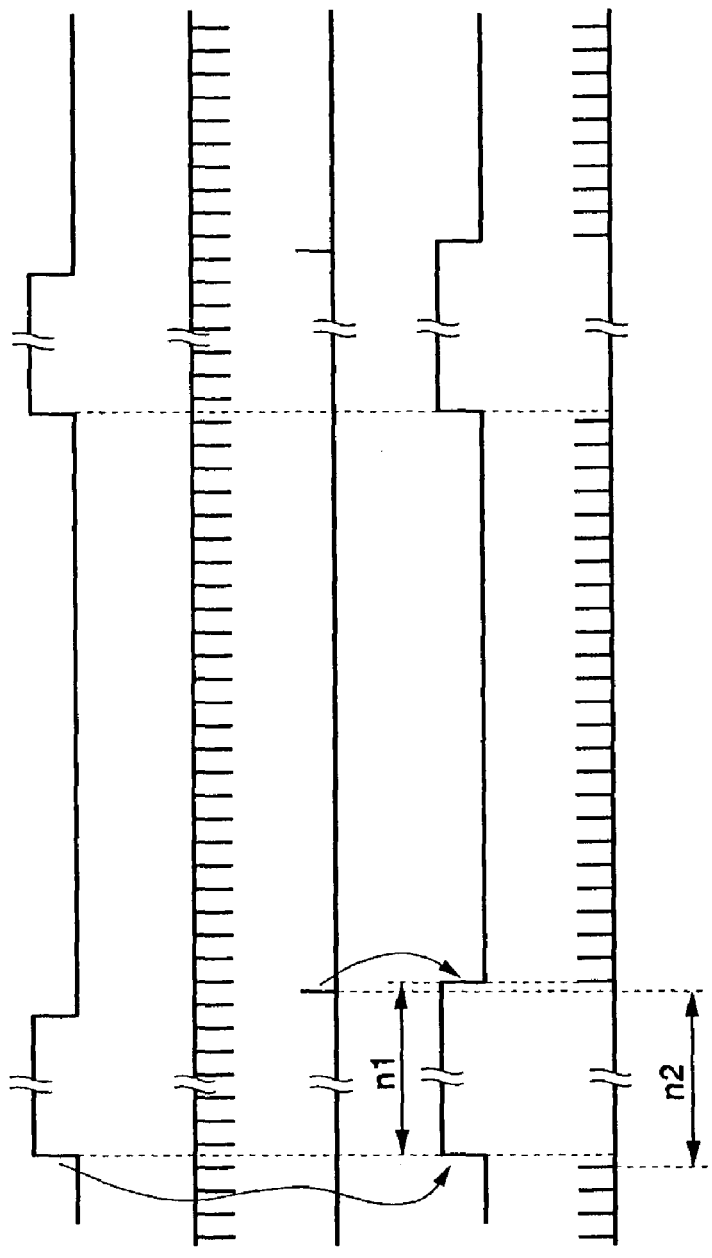

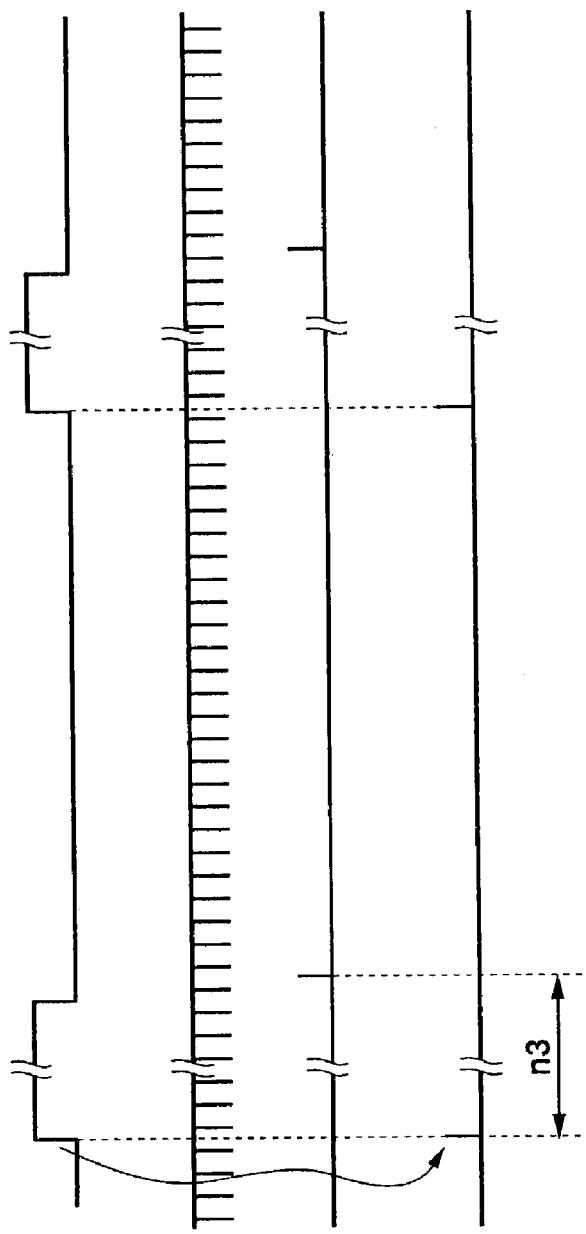

DRIVING CONTROL METHOD FOR IMAGE PICKUP DEVICE, IMAGE PICKUP APPARATUS, AND IMAGE PICKUP SYSTEM

BACKGROUND OF THE INVENTION

1. Field of the Invention

This invention relates to a driving control method for an image pickup device, an image pickup apparatus, and an image pickup system applied to a camera unit used mainly for factory automation (FA), for example, for picking up an image of an object moving at a high speed.

This application claims priority of Japanese Patent Application No. 2002-133529, filed on May 9, 2002, the entirety of which is incorporated by reference herein.

2. Description of the Related Art

As an image pickup device used for an image pickup apparatus such as a camera unit, a field storage-type solid-state image sensor such as a CCD image sensor is used. In some image pickup apparatuses using such a solid-state image sensor, the charge storage time of the solid-state image sensor is controlled, thereby adjusting exposure without using any mechanical iris mechanism and enabling high-speed shutter.

For example, in an image pickup apparatus used for FA, an external trigger is generated at the timing of detection output of an object sensor which detects an object transported by a belt conveyor or the like. Since a high speed and a constant speed of exposure are demanded of such an image pickup apparatus for industrial applications, the image pickup apparatus controls the charge storage time of the solid-state image sensor on the basis of this external trigger, thereby adjusting the exposure time to pick up an image of the object.

Specifically, in the image pickup apparatus, a shutter pulse SUB is generated at the timing of the leading edge of an external trigger pulse TRIG, as shown in FIG. 1. In response to this shutter pulse SUB, electric charges stored in the solid-state image sensor up to this point are swept away to a substrate and storage of electric charges is newly started. After that, a read-out pulse (sensor gate pulse) SG is generated. In response to this read-out pulse SG, the stored electric charges are read out. Therefore, the time from the generation of the shutter pulse SUB until the generation of the read-out pulse SG is the time when electric charges are stored. This time t1 is exposure time.

In this case, the shutter pulse SUB and the read-out pulse SG are usually controlled to be generated within a blanking period t2 of a video signal VIDEO so as not to affect an output image.

However, in the case of picking up an image with a slow shutter (long exposure time), as the timing of the external trigger pulse TRIG needs to be made early, it is set within an output period t3 of an image signal based on the trigger pulse TRI that is immediately before, as shown in FIG. 2. Since electric charges stored in the solid-state image sensor during the output period t3 of the image signal are swept away, also the image signal based on the electric charges is swept away, causing a problem that noise 20 is generated in an image displayed on a display device 10 such as a monitor device, as shown in FIG. 3.

Meanwhile, in the image pickup apparatus as described above, in order pickup an image of an object in response to the demand for reduction in inspection time of the object, increase in speed of the belt conveyor or the like and shortening of the cycle of the external trigger pulse TRIG are required.

However, when the external trigger pulse TRIG has a short cycle, the shutter pulse SUB generated by the external trigger pulse TRIG has a short cycle, too. In this case, too, the timing of the external trigger pulse TRIG is set within the output period t3 of the image signal based on the trigger pulse TRIG that is immediately before, as shown in FIG. 2. Therefore, there arises the problem of generation of noise 20 in the image displayed on the display device 10, as shown in FIG. 3.

Thus, when an image is picked up with a particularly slow shutter (long exposure time) and the cycle of the external trigger pulse TRIG is shortened, the possibility of generation of noise 20 in the image increases.

In this case, generation of noise 20 may be prevented if the external trigger pulse TRIG is controlled to be generated within the blanking period t2. To do this, however, it is necessary to judge the narrow blanking period t3 from the timing of the synchronizing signal of the image sent out to the image pickup apparatus and generate the external trigger pulse within this period t3. The control for this is not easy and the structure of the device for generating the external trigger is complicated. Moreover, when the image pickup apparatus operates in accordance with an internal synchronizing signal instead of the synchronizing signal of the image sent from outside, the synchronizing signal of the image of the image pickup apparatus must be outputted to an external device and the narrow blanking period must be recognized in the external device. In this case, too, the structure of the device is complicated.

These problems are not limited to the image pickup apparatus for industrial applications. In typical image pickup apparatuses which perform shutter control at the timing of a trigger pulse TRIG, similar problems arise when the cycle of the external trigger pulse TRIG is shortened or when the exposure time is elongated.

SUMMARY OF THE INVENTION

Thus, in view of the foregoing status of the art, it is an object of the present invention to provide a control method for an image pickup device, an image pickup apparatus, and an image pickup system that enable prevention of generation of noise in an image from the image pickup apparatus, with a simple structure and irrespective of the exposure time and the cycle of a trigger pulse, in the case of performing shutter control based on the trigger pulse, and thus enable elongation of the exposure time and shortening of the cycle of the external trigger pulse TRIG.

In order to solve the foregoing problems, according to an aspect of the present invention, there is provided a driving control method for an image pickup device in which electric charges obtained by photoelectric conversion of incident light from an object are stored, the stored electric charges are swept away when a shutter pulse is supplied, and after a read-out pulse is supplied, an image pickup signal based on the stored electric charges is read out synchronously with a horizontal synchronizing signal, the read-out pulse being generated during a blanking period of the horizontal synchronizing signal, the shutter pulse being generated during every horizontal blanking period of the horizontal synchronizing signal except for a period from at least generation of a trigger pulse supplied from outside until generation of the read-out pulse.

According to the present invention, since the shutter pulse is not generated during the period from the generation of the trigger pulse supplied from outside until the generation of the read-out pulse, no shutter pulse is generated at the timing of the leading edge of the trigger pulse. Therefore, even if the exposure time is elongated or the cycle of the trigger pulse is shortened and the leading edge of the trigger pulse is generated between pulses of the horizontal synchronizing signal, for example, during the period when the image signal is being outputted, the shutter pulse is not generated and therefore generation of noise in that output image can be prevented.

As the shutter pulse, either a first shutter pulse generated during every horizontal blanking period of the horizontal synchronizing signal except for the period from the generation of at least the trigger pulse supplied from outside until the generation of the read-out pulse or a second shutter pulse generated at the timing of the generation of the trigger pulse may be selected.

Thus, since one of the two types of shutter pulses, that is, the first shutter pulse for controlling the exposure time of the image pickup device by not generating the shutter pulse for a predetermined period on the basis of the trigger pulse and the second shutter pulse for controlling the exposure time of the image pickup device by generating the shutter pulse on the basis of the trigger pulse, can be selected, it is possible to perform control to prevent generation of noise in the output image by selecting the first shutter pulse only when it is necessary, for example, when the exposure time is to be elongated but the cycle of the trigger pulse is to be shortened.

In order to solve the foregoing problems, according to another aspect of the present invention, there is provided an image pickup apparatus having an image pickup device in which electric charges obtained by photoelectric conversion of incident light from an object are stored, the stored electric charges are swept away when a shutter pulse is supplied, and after a read-out pulse is supplied, an image pickup signal based on the stored electric charges is read out synchronously with a horizontal synchronizing signal, the image pickup apparatus including read-out pulse generation means for generating the read-out pulse during a blanking period of the horizontal synchronizing signal, and shutter pulse generation means for generating the shutter pulse during every horizontal blanking period of the horizontal synchronizing signal except for a period from at least generation of a trigger pulse supplied from outside until generation of the read-out pulse.

According to the present invention, since the shutter pulse is not generated during the period from the generation of the trigger pulse supplied from outside until the generation of the read-out pulse, no shutter pulse is generated at the timing of the leading edge of the trigger pulse. Therefore, even if the leading edge of the trigger pulse is generated, for example, during the period when the image signal is being outputted, generation of noise in that output image can be prevented.

The image pickup apparatus may also include first shutter pulse generation means for generating a first shutter pulse during every horizontal blanking period of the horizontal synchronizing signal except for the period from the generation of at least the trigger pulse supplied from outside until the generation of the read-out pulse, second shutter pulse generation means for generating a second shutter pulse at the timing of the generation of the trigger pulse, and selection means for selecting one of the first shutter pulse and the second shutter pulse as the shutter pulse.

Thus, since one of the two types of shutter pulses, that is, the first shutter pulse and the second shutter pulse, can be selected by the selection means, it is possible to perform control to prevent generation of noise in the output image by selecting the first shutter pulse only when it is necessary.

In order to solve the foregoing problems, according to still another aspect of the present invention, there is provided an image pickup system including: an image pickup apparatus and an image pickup control apparatus; the image pickup apparatus having an image pickup device in which electric charges obtained by photoelectric conversion of incident light from an object are stored, the stored electric charges are swept away when a shutter pulse is supplied, and after a read-out pulse is supplied, an image pickup signal based on the stored electric charges is read out synchronously with a horizontal synchronizing signal, the image pickup apparatus including read-out pulse generation means for generating the read-out pulse during a blanking period of the horizontal synchronizing signal, and shutter pulse generation means for generating the shutter pulse during every horizontal blanking period of the horizontal synchronizing signal except for a period from at least generation of a trigger pulse supplied from outside until generation of the read-out pulse; the image pickup control apparatus being adapted for outputting the trigger pulse designating image pickup of the object supplied from outside, to the image pickup apparatus, and for taking an image pickup signal from the image pickup apparatus and outputting an image signal.

Thus, since generation of noise in the output image can be prevented even if the leading edge of the trigger pulse from the image pickup control apparatus is generated during the period when the image signal is being outputted, the trigger pulse can be generated irrespective of the horizontal synchronizing signal. As it is not necessary to control the timing of the trigger pulse to generate the trigger pulse within the blanking period of the horizontal synchronizing signal, the apparatus on the trigger pulse generation side can be simplified. This enables simplification of the entire image pickup system.

The image pickup apparatus of the image pickup system may also include first shutter pulse generation means for generating a first shutter pulse during every horizontal blanking period of the horizontal synchronizing signal except for the period from the generation of at least the trigger pulse supplied from outside until the generation of the read-out pulse, second shutter pulse generation means for generating a second shutter pulse at the timing of the generation of the trigger pulse, and selection means for selecting one of the first shutter pulse and the second shutter pulse as the shutter pulse.

Thus, since one of the two types of shutter pulses, that is, the first shutter pulse and the second shutter pulse, can be selected by the selection means, it is possible to perform control to prevent generation of noise in the output image by selecting the first shutter pulse only when it is necessary.

As is described above, according to the present invention, generation of noise in the image from the image pickup apparatus can be prevented irrespective of the exposure time and the cycle of the trigger pulse. Even if the leading edge of the trigger pulse is generated between pulses of the horizontal synchronizing signal (for example, during the period when the image signal is being outputted), no shutter pulse is generated and therefore generation of noise in that output image can be prevented. This enables elongation of the exposure time and shortening of the cycle of the external trigger pulse.

Moreover, since generation of noise in the output image can be prevented even if the leading edge of the trigger pulse is generated during the period when the image signal is being outputted, the trigger pulse can be generated irrespective of the horizontal synchronizing signal. As it is not necessary to control the timing of the trigger pulse to generate the trigger pulse within the blanking period of the horizontal synchronizing signal, the apparatus on the trigger pulse generation side can be simplified.

Furthermore, since one of the two types of shutter pulses, that is, the first shutter pulse and the second shutter pulse, can be selected, it is possible to perform control to prevent generation of noise in the output image by selecting the first shutter pulse only when it is necessary, for example, when the exposure time is to be elongated but the cycle of the trigger pulse is to be shortened.

BRIEF DESCRIPTION OF THE DRAWINGS

FIGS. 8A to 8E show the operation timing when a first shutter pulse of the sub-timing generator is selected.

FIGS. 9A to 9D show the operation timing when a second shutter pulse of the sub-timing generator is selected.

DESCRIPTION OF THE PREFERRED EMBODIMENT

Figure 1:
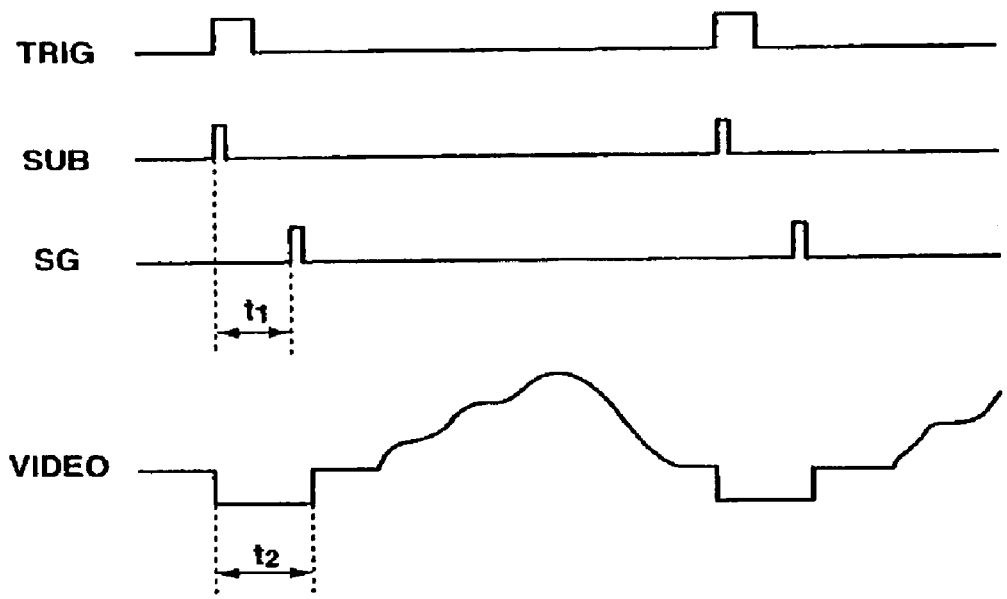
FIG. 1 shows the operation timing of a conventional image pickup apparatus.
Figure 2:
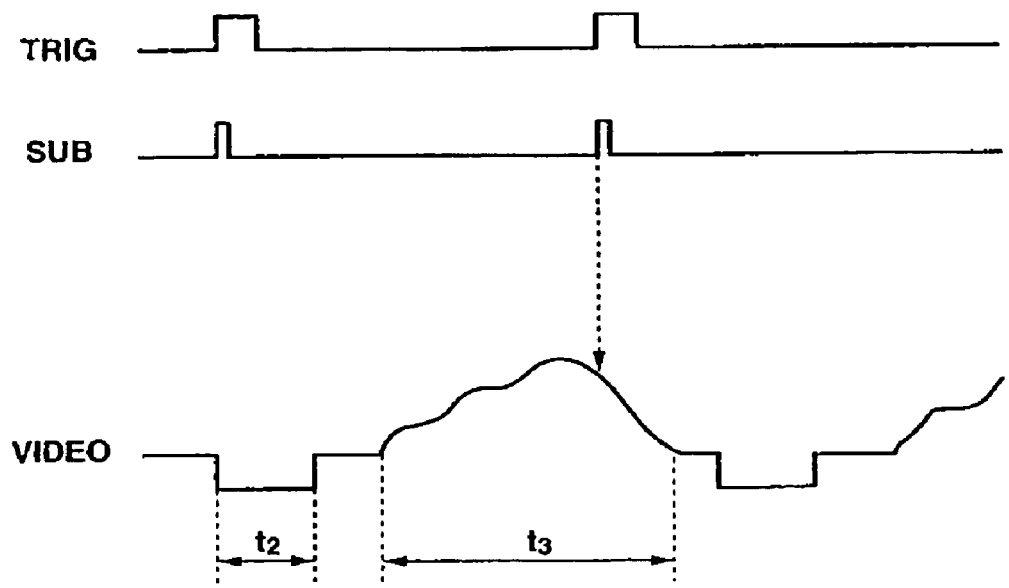
FIG. 2 shows the operation timing of the conventional image pickup apparatus.
Figure 3:
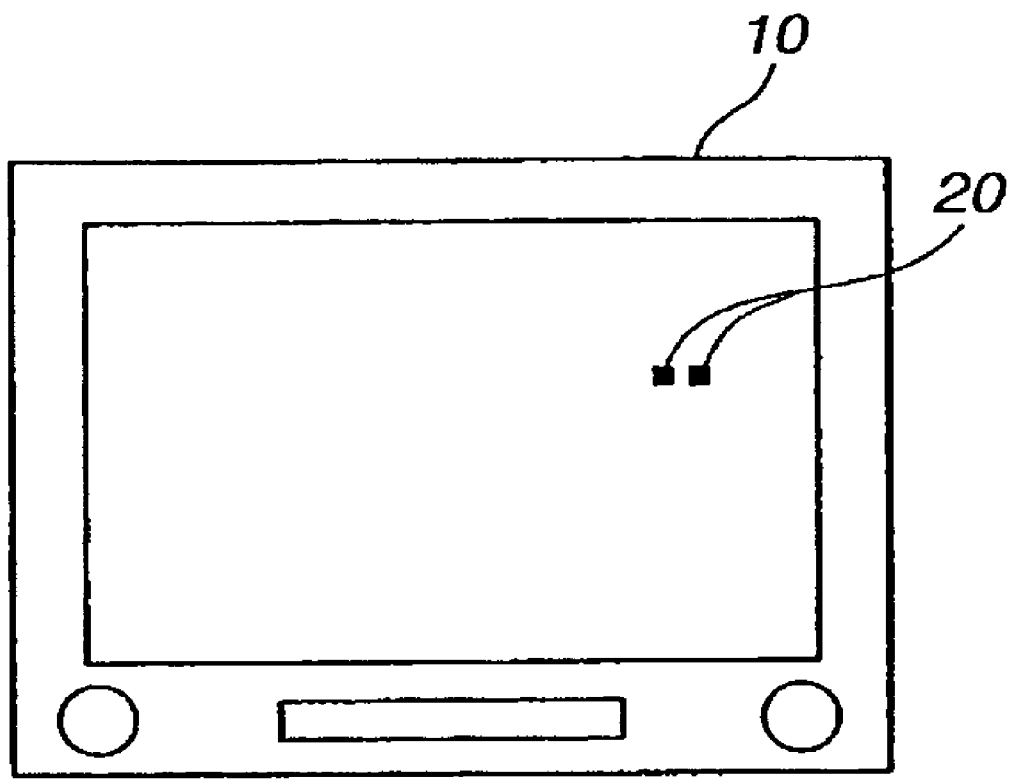
FIG. 3 is a view for explaining an image from the conventional image pickup apparatus.
Figure 4:
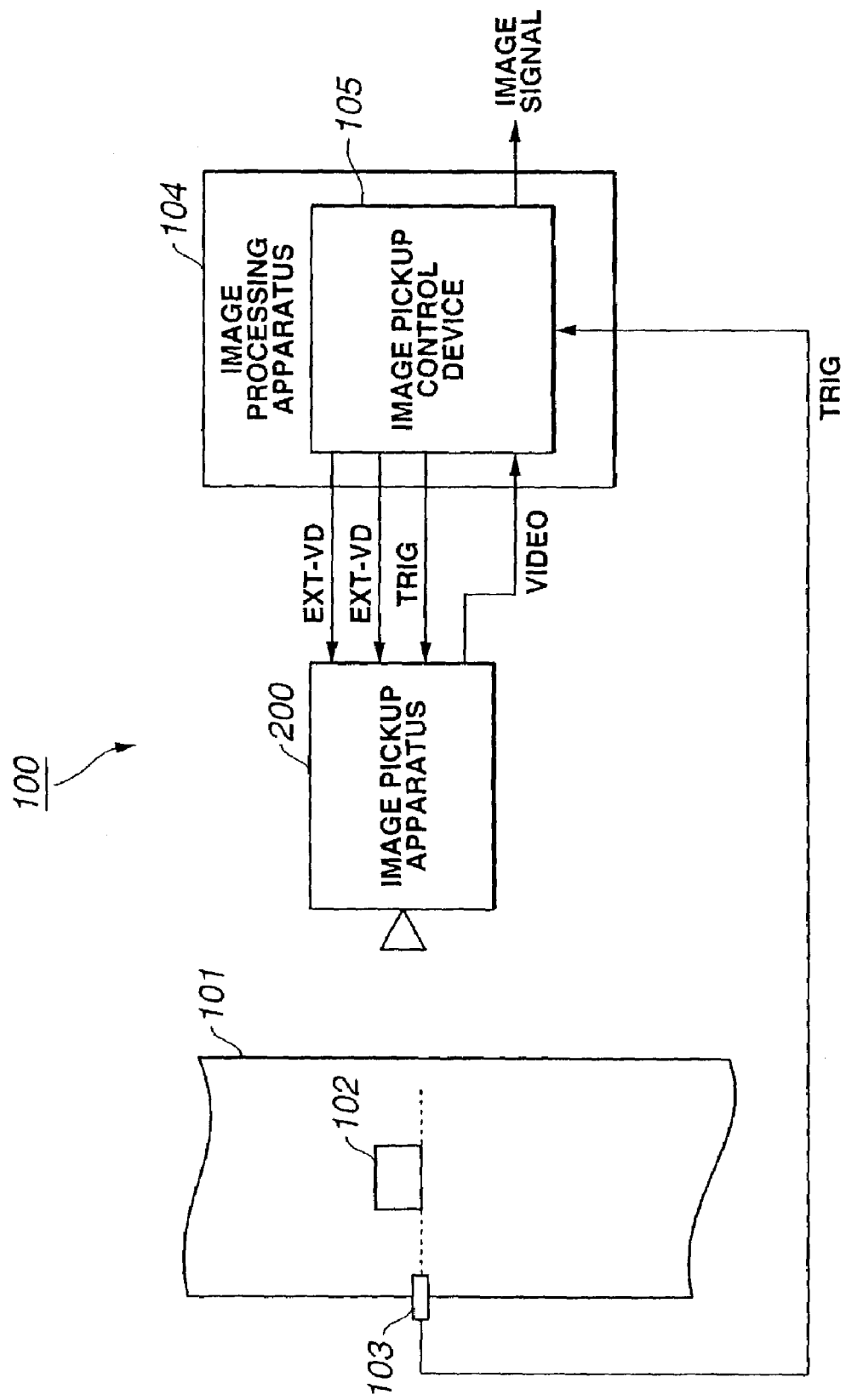
FIG. 4 shows an overall structure of an image pickup system according to an embodiment of the present invention.

An embodiment of the present invention will now be described with reference to the drawings. FIG. 4 shows an exemplary structure of an image pickup system according to the present invention. This image pickup system 100 picks up an image of an object 102 using an image pickup apparatus 200 and takes that image therein on the basis of a detection output of an object sensor 103 for detecting the object 102 transported through a transport path 101 made up of a belt conveyor or the like.

In this image pickup system, operation control of the image pickup apparatus 200 is performed by an image pickup control device 105 provided in an image processing apparatus 104 in accordance with the detection output of the object sensor 103, and a video signal VIDEO taken from the image pickup apparatus 200 is outputted outside as an image signal. The outputted image signal is displayed, for example, on a screen of a monitor device or the like. By the image processing apparatus 104, image processing or the like may be performed to the video signal VIDEO from the image pickup apparatus 200.

In this image pickup system, the object sensor 103 detects the object 102 transported through the transport path 101, generates a trigger pulse TRIG at the timing when the object 102 reaches the front side of the object sensor 103, and supplies this trigger pulse TRIG to the image pickup control device 105. The image pickup control device 105 supplies this trigger pulse TRIG to the image pickup apparatus 200.

Figure 5:
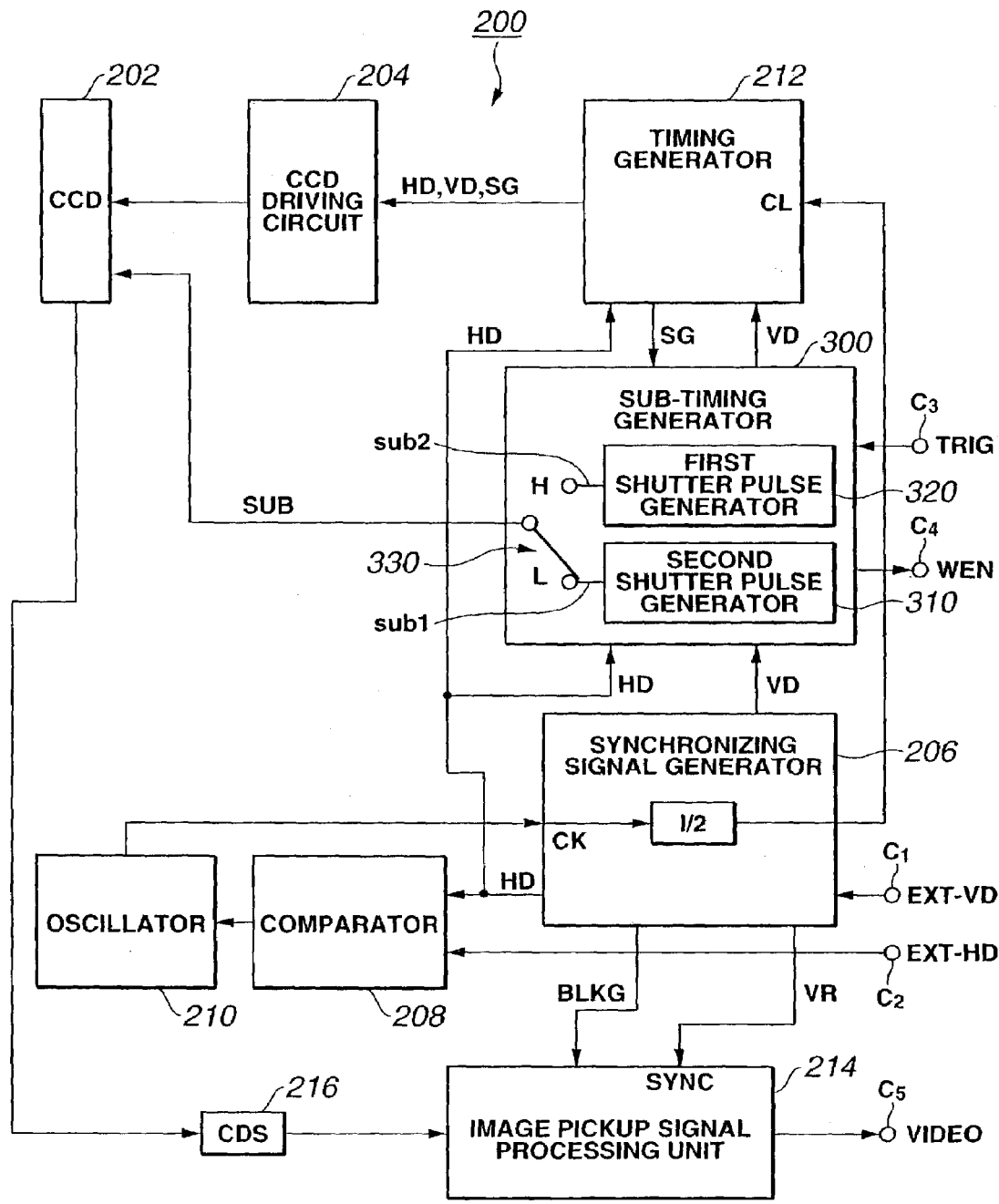
FIG. 5 shows a structure of an image pickup apparatus used in the image pickup system.

The image pickup apparatus 200 has a CCD image sensor 202 as an image pickup device, a CCD driving circuit 204, a synchronizing signal generator 206, a comparator 208, an oscillator 210, a timing generator 212 as read-out pulse generation means, a sub-timing generator 300, an image pickup signal processing unit 214, and CDS 216, as shown in FIG. 5.

The CCD image sensor 202 is constituted by, for example, an interline transfer-type (IT-type) CCD image sensor. Specifically, the CCD image sensor 202 has a light receiving unit equivalent to pixels of odd fields, a light receiving unit equivalent to pixels of even fields, a vertical transfer unit to which electric charges stored in the light receiving units are read out, and a horizontal transfer unit for outputting the electric charges read out to the vertical transfer unit, as an image pickup signal of one horizontal line. The CCD image sensor 202 has an electric shutter function to control the electric potential of a substrate formed below the light receiving units and thereby sweep away the electric charges stored in the light receiving units to the substrate, thus controlling the charge storage time.

The synchronizing signal generator 206 inputs therein an external vertical synchronizing signal EXT-VD supplied from the image pickup control device 105 via a terminal C1 and generates an internal vertical synchronizing signal VD and an internal horizontal synchronizing signal HD. The vertical synchronizing signal VD is supplied to the sub-timing generator 300. The horizontal synchronizing signal HD is supplied to one input terminal of each of the timing generator 212, the sub-timing generator 300 and the comparator 208. To the other terminal of the comparator 208, an external horizontal synchronizing signal EXT-HD is inputted from the image pickup control device 105 via a terminal 2C. This comparator 208 detects and outputs a phase difference between the horizontal synchronizing signal HD and the external horizontal synchronizing signal EXT-HD inputted from the respective input terminals. The phase difference output from the comparator 208 is supplied to the oscillator 210. An output CK from the oscillator 210 is supplied to the synchronizing signal generator 206.

The synchronizing signal generator 206 is capable of performing external synchronization. When the external synchronizing signals EXT-VD, EXT-HD are supplied to the terminals C1, C2, the synchronizing signal generator 206 generates internal synchronizing signals VD, HD synchronized with the external synchronizing signals EXT-VD, EXT-HD. The synchronizing signal generator 206 also supplies to the timing generator 212, for example, a 14.3-MHZ clock CL obtained by dividing the frequency of the output CK from the oscillator 210. The synchronizing signal generator 206 also supplies blanking BLKG and a vertical reset pulse VR to the image pickup signal processing unit 214. The vertical reset pulse VR is inputted to the image signal processing unit 214 as a composite synchronizing signal SYNC.

The timing generator 212 generates a read-out pulse SG of the CCD image sensor 202 at predetermined timing and supplies the read-out pulse SG to the sub-timing generator 300 and the CCD driving circuit 204. The read-out pulse SG in this case is generated, for example, at the timing when several hundred counts of the block CL is finished after the horizontal synchronizing signal HD is counted nine times.

The timing generator 212 also latches the vertical synchronizing signal VD and the horizontal synchronizing signal HD using the block CL with its frequency divided to ½ by the synchronizing signal generator 206, and supplies the latched synchronizing signals to the CCD image sensor 202 via the CCD driving circuit 204. Thus, the CCD driving circuit 204 drives the CCD image sensor 202 so as to read out effective charges stored in the CCD image sensor 202 in accordance with the read-out pulse SG. The charges read out from the CCD image sensor 202 are supplied, as an image pickup signal, to the image pickup signal processing unit 214 via the correlation double sampling circuit (CDS) 216, which reduces random noise.

The image pickup signal processing unit 214 performs predetermined signal processing such as adding a synchronizing signal to the image pickup signal and performing gamma correction, and supplies the resultant signal to the image processing apparatus 104 via an output terminal C5. The image is supplied to a display device such as a monitor unit of an analyzer and displayed on its screen.

The sub-timing generator 300 has first shutter pulse generation means 310 for generating a first shutter pulse sub1 at timing that does not affect an image output period of an image signal, for example, at the timing of each horizontal blanking period of the horizontal synchronizing signal HD except for a period from at least the generation of the trigger pulse supplied from outside until the generation of the read-out pulse, and second shutter pulse generation means 320 for generating a second shutter pulse sub2 at the timing of the trigger pulse TRIG.

Since the first shutter pulse sub1 generated by the first shutter pulse generation means 310 is generated at the timing that does not affect the image output period of an image signal, the first shutter pulse sub1 is most suitable for the case where the shutter speed is slow (that is, the exposure time is relatively long). The second shutter pulse sub2 generated by the second shutter pulse generation means 320 is generated at the timing of the trigger pulse TRIG and therefore the second shutter pulse sub2 suffices when the shutter speed is fast (that is, the exposure time is relatively short).

The sub-timing-generator 300 also has a switch 330 as selection means. The switching of this switch 330 enables selective output of one of the shutter pulses sub1 and sub2 as a shutter pulse SUB. This switch 330 may be interlocked with, for example, an operating switch provided in an operating unit of the image pickup apparatus.

Alternatively, the switch 330 may be automatically switched in accordance with predetermined conditions. For example, the switch 330 may be automatically switched by a control signal of a control unit of the image pickup apparatus in accordance with the setting of the shutter speed. In this case, when the shutter speed is equal to or less than the preset speed, the shutter pulse sub1 is selected and outputted by the switch 330, and when the shutter speed is higher than the preset speed, the shutter pulse sub2 is selected and outputted by the switch 330. The preset shutter speed is selected within a range of, for example, 1/1000 to 1/2000.

The shutter speed may be detected from the width of the trigger pulse TRIG. In such a case, the switch 330 may be automatically switched in accordance with the width of the trigger pulse TRIG.

Figure 6:
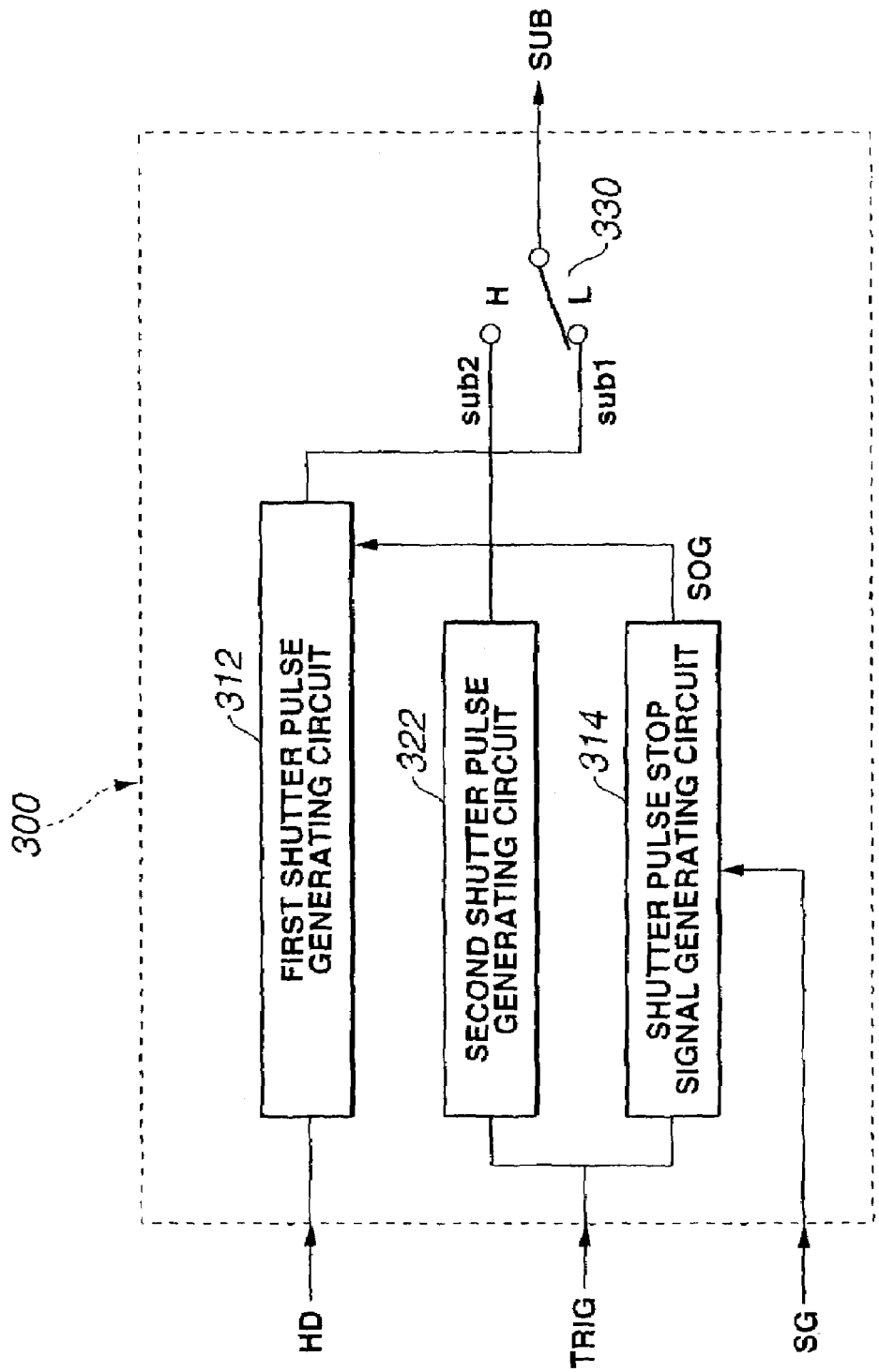
FIG. 6 shows an exemplary structure of a sub-timing generator in the image pickup apparatus.
Figure 7:
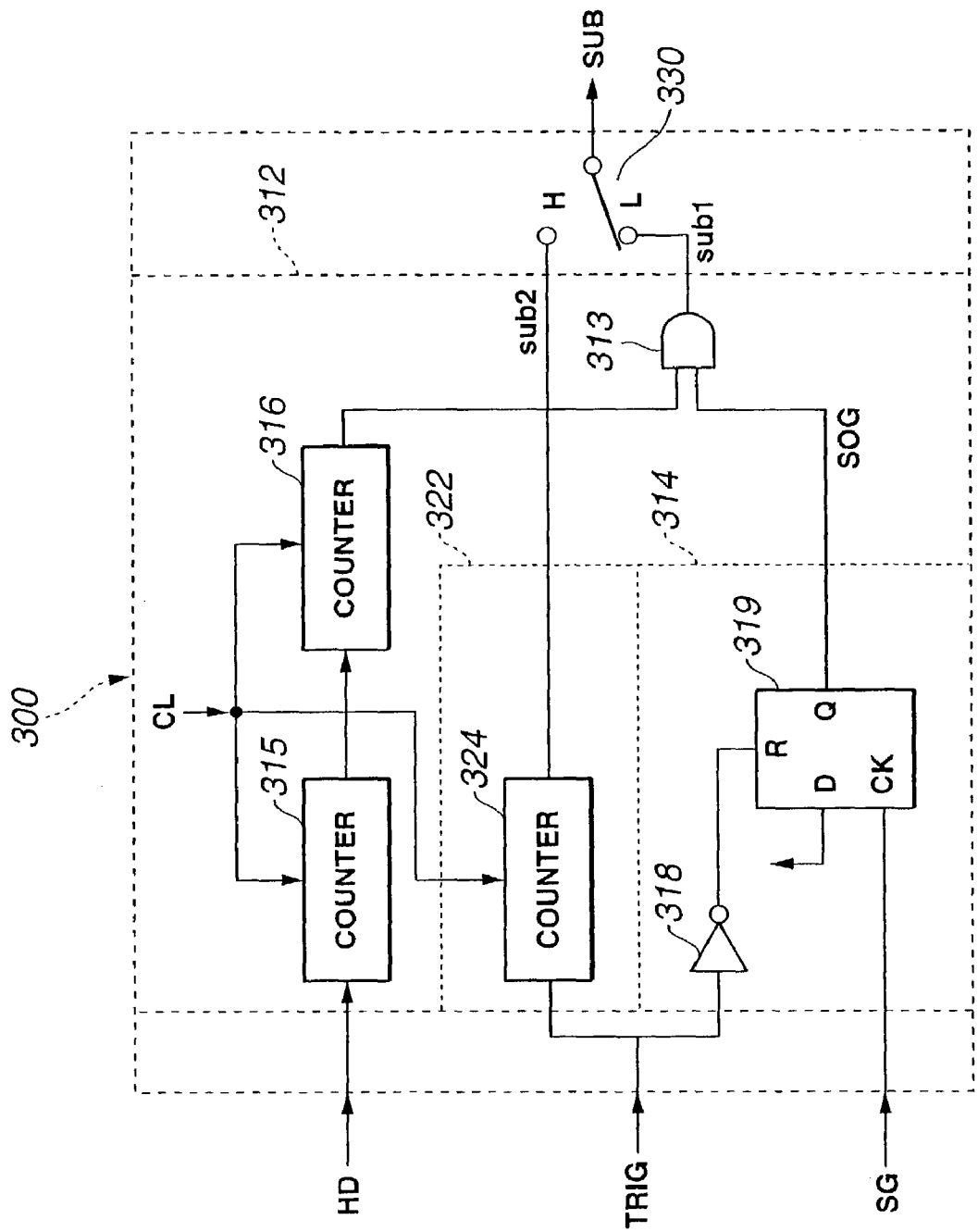
FIG. 7 shows a specific exemplary circuit structure of the sub-timing generator.

FIG. 6 shows an exemplary structure of the sub-timing generator 300. FIG. 7 shows a specific exemplary circuit structure of the sub-timing generator 300. FIGS. 8A to 8E and FIGS. 9A to 9D show the operation timing of the sub-timing generator 300. Of these, FIGS. 8A to 8E illustrate the operation timing of the first shutter pulse sub1, and FIGS. 9A to 9D illustrate the operation timing of the second shutter pulse sub2.

As shown in FIG. 6, the sub-timing generator 300 has a first shutter pulse generating circuit 312 constituting the first shutter pulse generation means 310, a shutter pulse stop signal generating circuit 314 for generating shutter pulse stop signal (shutter off-gate pulse) SOG for stopping the shutter pulse for a predetermined period, a second shutter pulse generating circuit 322 constituting the second shutter pulse generation means 320, and the switch 330.

The shutter pulse stop signal generating circuit 314 is supplied with a trigger pulse TRIG as shown in FIGS. 8A and 9A from the image pickup control device 105 via a terminal C3 and a read-out pulse SG as shown in FIGS. 8C and 9C from the timing generator 212. The shutter pulse stop signal generating circuit 314 generates a pulse that continues from the timing of the leading edge of the trigger pulse TRIG until the timing of a horizontal synchronizing signal HD that is immediately after the generation of the read-out pulse SG, and supplies the generated pulse as a shutter pulse stop signal SOG as shown in FIG. 8D to the first shutter pulse generating circuit 312.

The first shutter pulse generating circuit 312 is supplied with the shutter pulse stop signal SOG and a horizontal synchronizing signal HD as shown in FIGS. 8B and 9B. The first shutter pulse generating circuit 312 generates a first shutter pulse sub1 as shown in FIG. 8E at predetermined timing within the blanking period of the horizontal synchronizing signal HD except for the time period n1 of the shutter pulse stop signal SOG.

The trigger pulse TRIG is also supplied to the second shutter pulse generating circuit 322. The second shutter pulse generating circuit 322 generates a second shutter pulse sub2 as shown in FIG. 9D at the timing of the leading edge of the trigger pulse TRIG.

In the case of performing shutter control based on the trigger pulse TRIG, since an image section is not known, the sub-timing generator 300 may output a write enable signal WEN indicating an image section, to outside from a terminal C4, as shown in FIG. 5.

FIG. 7 shows a specific exemplary circuit structure of the sub-timing generator 300. The sub-timing generator 300 has the following parts: a counter 315, a counter 316 and an AND gate 313, which constitute the first shutter pulse generating circuit 312; an inverter 318 and a D-flip-flop 319, which constitute the shutter pulse stop signal generating circuit 314; a counter 324 constituting the second shutter pulse generating circuit 322; and the switch 330.

The counters 315, 316 and 324 are counters for performing a count operation based on, for example, a 14.3-MHZ clock CL obtained by dividing the frequency of the output CK from the oscillator 210 to ½.

The counters 315 and 316 generate a shutter pulse during the blanking period of the horizontal synchronizing signal HD. Specifically, the counter 315 inputs therein the horizontal synchronizing signal HD, then performs a count-up operation (carry output) after a predetermined time period (for example, after 12 clocks) from the timing of the leading edge of the blanking period of the horizontal synchronizing signal HD, and generates the leading edge of the shutter pulse. The counter 316 performs a count-up operation (carry output) after a predetermined time period (for example, after 49 clocks) from the count-up operation of the counter 315 and generates the trailing edge of the shutter pulse. The shutter pulse thus generated (output of the counter 316) is supplied to one input terminal of the AND gate 313.

The D-flip-flop 319 generates the shutter pulse stop signal SOG shown in FIG. 8D, which stops the shutter pulse generated by the counters 315 and 316 for a predetermined period. A reset terminal R of this D-flip-flop 319 is supplied with the trigger pulse TRIG via the inverter 318. A clock terminal (CK) of the D-flip-flop 319 is supplied with the read-out pulse SG. Since logic "H" is provided to a data input terminal D of the D-flip-flop 319 and the trigger pulse TRIG inverted via the inverter 318 is supplied to the reset terminal R, the D-flip-flop 319 is reset at every trailing edge of the trigger pulse TRIG. The D-flip-flop 309 latches the logic "H" at the data input terminal D using the read-out pulse SG as a clock and supplies its non-inverted output Q to the other input terminal of the AND gate 313.

Thus, the leading edge of the pulse of the shutter pulse stop signal SOG is generated at the timing of the generation (leading edge) of the trigger pulse TRIG, and the trailing edge of the pulse of the shutter pulse stop signal SOG is generated by the generation (leading edge) of the read-out pulse SG. The non-inverted output Q of the D-flip-flop 319 becomes the shutter pulse stop signal SOG.

The output of the AND gate 313 becomes the first shutter pulse sub1 shown in FIG. 8E and has logic "L" only during the period t1 of the shutter pulse stop signal SOG. The output (shutter pulse sub1) of this AND gate 313 is connected to an L-terminal of the switch 330.

The counter 324 inputs the trigger pulse TRIG therein and generates the second shutter pulse sub2 shown in FIG. 9D at the timing of the generation (leading edge) of the trigger pulse TRIG. The output (shutter pulse sub2) of this counter 324 is connected to an H-terminal of the switch 330.

In the image pickup apparatus 200 of such a structure, when an external horizontal synchronizing signal EXT-HD and an external vertical synchronizing signal EXT-VD conformable to, for example, the standard television system are supplied from the image pickup control device 105 and a trigger pulse TRIG generated on detection of the object 102 on the transport path 101 by the object sensor 103 is supplied, an image pickup operation is carried out on the basis of these signals.

Specifically, the synchronizing signal generator generates an internal horizontal synchronizing signal HD and an internal vertical synchronizing signal VD based on the external synchronizing signals EXT-HD and EXT-VD, and the timing generator 212 generates a read-out pulse SG during the blanking period of the horizontal synchronizing signal HD.

Moreover, the sub-timing generator 300 generates shutter pulses sub1 and sub2 based on the trigger pulse TRIG. Then, one of the shutter pulses sub1 and sub2 is selected by the switch 330 and supplied to the CCD driving circuit 204 as a shutter pulse SUB.

The CCD image sensor 202 stores electric charges obtained by photoelectric conversion of light incident from the object. The stored electric charges are swept away to the substrate when the shutter pulse SUB is supplied. After the read-out pulse SG is supplied, an image signal VIDEO based on stored electric charges is read out synchronously with the horizontal synchronizing signal HD.

When the first shutter pulse sub1 is selected (L-terminal is selected) by the switch 330, the shutter pulse sub1 is supplied to the CCD image sensor 202 as the shutter pulse SUB. The first shutter pulse sub1 is generated by the first shutter pulse generation means 310 on the basis of the trigger pulse TRIG and the read-out pulse SG. This first shutter pulse sub1 is generated every horizontal blanking period of the horizontal synchronizing signal HD except for the period n1 from the generation of the trigger pulse TRIG until the generation of the read-out pulse SG as shown in FIG. 8E.

As this first shutter pulse sub1 is supplied to the CCD image sensor 202, electric charges stored in the CCD image sensor 202 are swept away to the substrate when the first shutter pulse sub1 is generated. During the period when the first shutter pulse sub1 is not generated, electric charges are stored in the CCD image sensor 202. Specifically, electric charges are stored in the CCD image sensor 202 after the shutter pulse that is immediately before the leading edge of the pulse of the shutter pulse stop signal SOG.

After that, when the read-out pulse SG is generated, an image signal VIDEO based on the stored electric charges is read out from the CCD image sensor 202 synchronously with the horizontal synchronizing signal. Therefore, the exposure time based on the first shutter pulse sub1 is a time period n2 from the shutter pulse that is immediately before the leading edge of the pulse of the shutter pulse stop signal SOG until the generation (leading edge) of the read-out pulse SG as shown in FIG. 8E.

In this manner, when the first shutter pulse sub1 is selected by the switch 330 as the shutter pulse SUB, the shutter pulse is not generated during the period n1 of the pulse of the shutter pulse stop signal SOG and therefore the shutter pulse is not generated at the timing of the leading edge of the trigger pulse TRIG.

Therefore, even if the exposure time is elongated or the cycle of the trigger pulse is shortened and the leading edge of the trigger pulse TRIG is generated between pulses of the horizontal synchronizing signal HD, for example, during the period when an image signal is being outputted, the shutter pulse is not generated and occurrence of noise in the output image can be prevented. Particularly, since the trigger pulse TRIG from outside is not synchronized with the horizontal synchronizing signal HD of the image pickup apparatus 200 and the possibility of generation of this trigger pulse between pulses of the horizontal synchronizing signal HD is high, the present invention can be effectively applied.

Thus, in the case of performing shutter control based on the trigger pulse TRIG, the trigger pulse TRIG can be prevented from affecting an image from the image pickup apparatus irrespective of the exposure time and the cycle of the trigger pulse TRIG. Therefore, the exposure time can be elongated and the cycle of the trigger pulse TRIG can be shortened. For example, it is possible to shorten the cycle of the trigger pulse TRIG while taking a long exposure time.

Moreover, since occurrence of noise in the output image can be prevented even if the leading edge of the trigger pulse TRIG is generated during the period when the image signal is being outputted, as described above, the trigger pulse TRIG can be generated irrespective of the horizontal synchronizing signal HD. Therefore, the timing of the trigger pulse TRIG need not be controlled in such a manner that the trigger pulse TRIG is generated during the blanking period of the horizontal synchronizing signal HD, and the apparatus on the trigger pulse TRIG generation side can be simplified.

Although it is possible to prevent occurrence of noise in the output image even if the trigger pulse TRIG is generated during the blanking period of the horizontal synchronizing signal HD, the circuit for producing the trigger pulse TRIG is complicated and its timing control is difficult. However, the present invention is advantageous in that since an arbitrary trigger pulse TRIG that is constantly not synchronized with the horizontal synchronizing signal HD can be used as it is, the apparatus and system on the trigger pulse TRIG generation side can be simplified.

Next, when the second shutter pulse sub2 is selected (H-terminal is selected) by the switch 330, the second shutter pulse sub2 is supplied to the CCD image sensor 202 as a shutter pulse SUB. The second shutter pulse sub2 is generated by the second shutter pulse generation means 320 on the basis of the trigger pulse TRIG. This second shutter pulse sub2 is generated at the timing of the generation (leading edge) of the trigger pulse TRIG as shown in FIG. 9D. The second shutter pulse sub2 is not synchronized with the horizontal synchronizing signal HD.

As this second shutter pulse sub2 is supplied to the CCD image sensor 202, electric charges stored in the CCD image sensor 202 are swept away to the substrate at the timing of the generation of the second shutter pulse sub2.

After that, when the read-out pulse SG is generated, an image signal VIDEO based on stored electric charges is read out from the CCD image sensor 202 synchronously with the horizontal synchronizing signal HD. Therefore, the exposure time based on the second shutter pulse sub2 is a time period n3 from the generation of the second shutter pulse sub2 until the generation (leading edge) of the read-out pulse SG as shown in FIG. 9D.

Even if the trigger pulse has a short cycle, when the exposure time n3 is short, it suffices to select the second shutter pulse sub2. That is, when the exposure time n3 is short, it becomes easy to take the exposure time during the blanking period of the horizontal synchronizing signal HD. Therefore, the cycle of the trigger pulse can be shortened without generating noise in the output image.

Moreover, in the present embodiment, when generating the shutter pulse SUB, the two types of shutter pulses, that is, the first shutter pulse sub1, which controls the exposure time of the CCD image sensor 202 by not generating the shutter pulse for a predetermined period on the basis of the trigger pulse TRIG, and the second shutter pulse sub2, which controls the exposure time of the CCD image sensor 202 by generating the shutter pulse on the basis of the trigger pulse TRIG, can be selected by the switch 330. Therefore, it is possible to perform control so as not to generate noise in the output image by selecting the first shutter pulse sub1 only when necessary, for example, when the cycle of the trigger pulse is to be shortened while the exposure time is to be elongated.

Although the preferred embodiment of the present invention is described above with reference to the accompanying drawings, it should be understood by those ordinarily skilled in the art that various modifications, alternative constructions or equivalents can be implemented without departing from the scope and spirit of the present invention as set forth and defined by the appended claims, and that such modifications, alternative constructions or equivalents are included in the technical scope of the present invention.

For example, while the synchronizing signal generator, the timing generator 212 and the sub-timing generator 300 are separately constructed in the embodiment, these units may be collectively constructed with a one-chip semiconductor.

Moreover, while the present invention is applied to an image pickup system used for industrial applications such as FA in the embodiment, the present invention may be applied to any image pickup apparatus and image pickup system for home use and business applications other than industrial applications as long as it performs image pickup using a shutter based on a trigger pulse.

What is claimed is:

1. A method for controlling an image pickup device of the type that converts an incident light image to electric charges that are stored, said method comprising the steps of:
   receiving a trigger pulse from a source externally of said image pickup device, said trigger pulse having a leading edge and a trailing edge;
   providing a horizontal synchronizing signal having a blanking period;
   generating shutter pulses synchronized with and occurring during the blanking period of said horizontal synchronizing signal for sweeping said stored electric charges;
   generating a read-out pulse subsequent to the trailing edge of said trigger pulse and during the blanking period of the horizontal synchronizing signal for reading out an image pickup signal based on said stored electric charges;
   generating an inhibit signal to inhibit said shutter pulses for an interval extending from the leading edge of said trigger pulse to the horizontal synchronizing signal that occurs immediately after said read-out pulse;
   inhibiting said shutter pulses for said interval; and
   reading out said image pickup signal synchronously with said horizontal synchronizing signal in response to said read-out pulse.

2. A method for controlling an image pickup device of the type that converts an incident light image to electric charges that are stored, said method comprising the steps of:
   receiving a trigger pulse from a source externally of said image pickup device, said trigger pulse having a leading edge and a trailing edge;
   providing a horizontal synchronizing signal having a blanking period;
   generating first shutter pulses synchronized with and occurring during the blanking period of said horizontal synchronizing signal;
   generating second shutter pulses synchronized with the leading edge of said trigger pulse;
   generating a read-out pulse subsequent to the trailing edge of said trigger pulse and during the blanking period of the horizontal synchronizing signal for reading out an image pickup signal based on said stored electric charges;
   generating an inhibit signal to inhibit said first shutter pulses for an interval extending from the leading edge of said trigger pulse to the horizontal synchronizing signal that occurs immediately after said read-out pulse;
   inhibiting said first shutter pulses for said interval;
   selecting either said first shutter pulses or said second shutter pulses for sweeping said stored electric charges; and
   reading out said image pickup signal synchronously with said horizontal synchronizing signal in response to said read-out pulse.

3. Image pickup apparatus, comprising;
   an image pickup device of the type that converts an incident light image to electric charges that are stored;
   an input for receiving a trigger pulse from a source externally of said image pickup device, said trigger pulse having a leading edge and a trailing edge;
   means for providing a horizontal synchronizing signal having a blanking period;
   means for generating shutter pulses synchronized with and occurring during the blanking period of said horizontal synchronizing signal for sweeping said stored electric charges;
   means for generating a read-out pulse subsequent to the trailing edge of said trigger pulse and during the blanking period of the horizontal synchronizing signal for reading out an image pickup signal from said image pickup device based on said stored electric charges;
   means for generating an inhibit signal to inhibit said shutter pulses for an interval extending from the leading edge of said trigger pulse to the horizontal synchronizing signal that occurs immediately after said read-out pulse;
   means for using said inhibit signal to inhibit said shutter pulses for said interval; and
   means for reading out said image pickup signal synchronously with said horizontal synchronizing signal in response to said read-out pulse.

4. Image pickup apparatus comprising:
   an image pickup device of the type that converts an incident light image to electric charges that are stored;
   an input for receiving a trigger pulse from a source externally of said image pickup device, said trigger pulse having a leading edge and a trailing edge;
   means for providing a horizontal synchronizing signal having a blanking period;
   means for generating first shutter pulses synchronized with and occurring during the blanking period of said horizontal synchronizing signal;
   means for generating second shutter pulses synchronized with the leading edge of said trigger pulse;

means for generating a read-out pulse subsequent to the trailing edge of said trigger pulse and during the blanking period of the horizontal synchronizing signal for reading out an image pickup signal based on said stored electric charges;

means for generating an inhibit signal to inhibit said first shutter pulses for an interval extending from the leading edge of said trigger pulse to the horizontal synchronizing signal that occurs immediately after said read-out pulse;

means for using said inhibit signal to inhibit said first shutter pulses for said interval;

means for selecting either said first shutter pulses or said second shutter pulses for sweeping said stored electric charges; and means for reading out said image pickup signal synchronously with said horizontal synchronizing signal in response to said read-out pulse.

* * * * *